United States Patent
Regnier et al.

(10) Patent No.: US 12,510,546 B2
(45) Date of Patent: Dec. 30, 2025

(54) MOLECULAR RECOGNTION ASSAYS OF CRITICAL STRUCTURE ATTRIBUTES IN PROTEOFORMS

(71) Applicant: Novilytic, LLC, West Lafayette, IN (US)

(72) Inventors: Fred Regnier, West Lafayette, IN (US); Jinhee Kim, West Lafayette, IN (US); Meena Narsimhan, West Lafayette, IN (US); Nathan Morris, West Lafayette, IN (US); Mary Bower, Lafayette, IN (US)

(73) Assignee: Novilytic, LLC, West Lafayette, IN (US)

( * ) Notice: Subject to any disclaimer, the term of this patent is extended or adjusted under 35 U.S.C. 154(b) by 493 days.

(21) Appl. No.: 18/060,200

(22) Filed: Nov. 30, 2022

(65) Prior Publication Data

US 2024/0175875 A1 May 30, 2024

(51) Int. Cl.
*G01N 33/68* (2006.01)
*G01N 21/64* (2006.01)
(Continued)

(52) U.S. Cl.
CPC ..... *G01N 33/6845* (2013.01); *G01N 21/6428* (2013.01); *G01N 30/14* (2013.01); *G01N 30/72* (2013.01)

(58) Field of Classification Search
CPC ........... G01N 33/6845; G01N 21/6428; G01N 30/14; G01N 30/72
See application file for complete search history.

(56) References Cited

U.S. PATENT DOCUMENTS

| | | |
|---|---|---|
| 10,281,474 B2 | 5/2019 | Regnier et al. |
| 2014/0273260 A1 | 9/2014 | Regnier et al. |

(Continued)

OTHER PUBLICATIONS

Kawate, T., et al., "Fluorescence-detection size-exclusion chromatography for precrystallization screening of integral membrane proteins", Structure, 14, pp. 673-681. (Year: 2006).*

(Continued)

*Primary Examiner* — Benjamin L Lebron
(74) *Attorney, Agent, or Firm* — Maginot, Moore & Beck

(57) ABSTRACT

A method is provided to simultaneously identify and quantify critical structure attributes (CSAs) in proteoforms or proteoform families that includes the steps of:
1. injecting a sample into a reagent stream of one or more detection enhanced molecular recognition reagents;
2. incubating the combined sample:reagent(s) during migration through an analytical platform the causes molecular recognition reagent(s) to be sequestered by a specific critical structure attribute (CSA) in the analyte to form a luminon ($A_n$:*$S_{as}$) complex;
3. using a sequestron selector in the reagent stream to overtake the luminon complex in a down-stream size exclusion chromatography (SEC) column to achieve mixing and formation of an $N_c$~$P_{as}$:$A_n$:*$S_{as}$, $P_{as}$:$A_n$:*$S_{as}$, or *$P_{as}$:$A_n$:*$S_{as}$ sequestome complex;
4. resolving this sequestome complex from any unbound affinity selector(s) such as *$S_{as}$ or *$P_{as}$, and non-analytes in the SEC column;
5. transporting the resolved sequestome complex into a flow-through detection means that detects and quantifies CSAs in fluorescent labeled *$S_{as}$ or *$P_{as}$ bearing luminon or sequestome complex to generate data for the construction of critical structure attribute ratio plots as a function of elapsed fermentation time.

12 Claims, 8 Drawing Sheets

(51) Int. Cl.
*G01N 30/14* (2006.01)
*G01N 30/72* (2006.01)

(56) References Cited

U.S. PATENT DOCUMENTS

| | | |
|---|---|---|
| 2016/0089669 A1 | 3/2016 | Regnier et al. |
| 2018/0284129 A1 | 10/2018 | Regnier et al. |
| 2022/0137063 A1 | 5/2022 | Regnier et al. |

OTHER PUBLICATIONS

International Search Report and Written Opinion of corresponding application PCT/US2023/081391, dated May 1, 2024 (16 pages).

\* cited by examiner

MOLECULAR RECOGNTION ASSAYS OF CRITICAL STRUCTURE ATTRIBUTES IN PROTEOFORMS

BACKGROUND

Therapeutic recombinant proteins are complex products produced in fermenters operated in either a batch or a continuous harvesting mode. In both cases it is desirable to ensure continuous batch-to-batch consistency and quality through real-time testing. The need for continuous process validation (CPV) during therapeutic protein production was first proposed by the FDA in a 1987 document entitled "Guidelines on General Principles of Process Validation". This was followed in 2004 and 2011 by additional guidelines enumerating the need for "a planned set of controls, derived from product and process understanding that confirms process performance and product quality" within and between lots. The FDA guidelines suggest this be done by continuously monitoring critical quality attributes (CQAs). A CQA has been defined as the impact a biopharmaceutical protein, product-related impurity, process-related impurity, or contaminant might have on the biological activity, pharmacokinetics, pharmacodynamics, immunogenicity, toxicity or overall safety and efficacy of a therapeutic product.

The present disclosure relates to analytical platforms and methods that identify and quantify critical structural attributes (CSAs) of proteoforms on a recurring basis. CSAs are a subset of critical quality attributes (CQAs), being defined here as structural features of a substance required for its subsequent use. Enabling features of the systems and methods in the present disclosure are: i) CSA analyses of a product proteoform or proteoform family during synthesis; ii) automation of the requisite sample preparation, identification, and quantification steps in CSA assays; iii) achieving CSA assays within the time-window required for remediation of process deviations before product quality is compromised; and iv) execution of CQA analyses at-line (or on-line) during a manufacturing campaign.

The genetic component of therapeutic protein expression in a host-cell culture is of major importance in explaining the origin and deviation in critical structure attributes (CSAs) of a product protein within a fermenter. An exon from a single gene supplies sequence code for multiple forms of the protein, producing a genetically related family of structural isoforms referred to as a proteoform family or "proteoforms". Proteoforms vary in biological activity and half-life even though they are of similar structure. Current understanding of the origin of proteoform families is that their synthesis starts with DNA transcription via the formation of pre- and primary-mRNA species. This process involves a combination of intron excisions, exon rearrangements and/or shuffling, exon fusion, RNA copy number regulation, and epigenetic imprinting; all of which are enabled by a series of enhancers and silencers. Post-transcriptional processing subsequently leads to the production of mature mRNA species, this process being accompanied by variations in splicing, enzymatic editing, and reading frame shifts. The net outcome is that multiple mRNA species arise from a single protein-coding gene during these processing steps, each of which produce different proteoforms. Alternative splicing of mRNA, single amino acid polymorphism, and post-translational modifications (PTMs) play a further role in proteoform complexity. This leads to the expression of a genetically related family of many members referred to as a proteoform family (or proteoforms). Clearly, the potential for variation in regulatory control during proteoform expression in a fermenter can lead to alterations in the structure of family members and concomitantly therapeutic protein quality.

Although liquid chromatography-mass spectral (LC-MS) analysis of a purified proteoform family is the current gold standard in protein quality control, it is not the best choice for continuous process validation (CPV). Primary structure data obtained by LC-MS does not easily correlate with individual critical structure attributes (CSAs) and sample preparation can take 6-12 hours. This is too long to allow process remediation before product quality is compromised. Additionally, LC-MS instrumentation is expensive, of high maintenance, and must be operated by one of skill in the art. Circumventing these limitations is the focus of the present disclosure.

Like LC-MS, chromatographic and electrophoretic techniques provide well known avenues for sample analysis. The primary shortcoming of these techniques in continuous process validation is that they are overwhelmed by the sample complexity and by the time allowed for the analyses of individual critical structure attributes. Separation peak capacity in these systems seldom exceeds a hundred while biological fluids can have ten thousand or more components. A hundred or more substances could occur in a single separation fraction. This means that, even in LC-MS, samples must be subjected to multiple separation dimensions to resolve and identify CSAs in continuous process validation. Additionally, the columns involved must be recycled between analyses. The time required in these multi-dimensional methods exceeds the decision-time-window required for remediation.

It will be appreciated by those skilled in the relevant art that similar issues in clinical diagnostics are addressed by enzyme linked immunosorbent assays (ELISA). The approach in ELISA is to use multiple antibodies to recognize an intact analyte. A first antibody captures the protein antigen on a solid phase surface and a second antibody targets one or more epitopes within the antigen. The function of the second antibody is to further confirm the identity of the antigen selected by the first antibody and provide a means of detection. With ELISA, that would be an enzyme conjugated to the second antibody. The advantage of this antigen sandwich assay method is that thousand-fold levels of antigen purification and detection selectivity are achieved in a single assay. An advantage of ELISA methods is that antigen analyses are based on structure recognition of native proteins. Limitations of the method are: i) inability to simultaneously identify multiple critical quality attributes; ii) dependence on antibody affinity selectors; and iii) discarding assay kits after a single use.

Mobile affinity sorbent chromatography (MASC) is a more advanced form of structure recognition assays. With this method a 50 nm sequestron nanoparticulate bearing an immobilized affinity selector is used to target a specific antigen in the mobile phase of a size exclusion chromatography (SEC) column. A major advantage in this approach is that nanoparticles of this size elute in the effluent void volume of the SEC column. Proteoforms bind to the surface of sequestrons with high selectivity, moving through an SEC column with greater linear velocity. The net outcome is that analytes are sequestered and quickly resolved from other sample components. Limitations of MASC are that the method uses a single antibody affinity selector and antigen detection requires desorption. This is a similar limitation of affinity chromatography.

Luminex multiplexing immunoassays are another widely used solid phase immunoassay. With this method, an analyte-specific antibody is coated onto a color-coded 10 um particle that along with standards and samples is added to sample wells. The color-code on the particle identifies the immunological assay being executed on the bead. During incubation the immobilized antibody binds the targeted analyte of interest. After washing a biotinylated second antibody cocktail specific for the analyte of interest is added to each well and washed again.

Streptavidin-phycoerythrin conjugate (Streptavidin-PE) is bound to the biotinylated second antibody and then washed to remove unbound Streptavidin-PE. The function of the Streptavidin-PE is to identify the analyte being assayed on the particle. Particles for multiple analytes are then suspended in buffer and the $Ab_1:Ag:^2Ab:$Lumiphore sandwich is subsequently read with a Luminex analyzer. The Luminex assay is identical to the ELISA assay except for the means of detection. Quantification is determined by the magnitude of the phycoerythrin-derived fluorescence.

Lateral flow immunological assays (LFIA) on paper similarly exploit antibody selectivity to elevate analyte discrimination. It is well known in this method to load a gold-particle labeled antibody on the paper strip wherein a soluble antigen:antibody complex is formed as antigen is transported laterally by capillary wetting through a zone of immobilized antigen targeting antibody. The labeled complex is captured by the immobilized antibody, forming a visually apparent spot.

Sandwich type immunological assay methods have revolutionized protein identification and quantification. But ELISA and other sandwich type assays were discovered in 1971, long before recognition that most proteins occur as a proteoform family. There is a need to identify multiple structural features within a single family in a single assay. This is inherent in the FDA mandate that therapeutic protein production be viewed in terms of a series of critical quality attributes within a family of therapeutic proteoforms, the ratio of which determines efficacy and quality.

SUMMARY OF THE DISCLOSURE

Differentiating features of the sequestome and luminon assays described in the present disclosure are that: i) assays are executed without antibody affinity selectors, as in ELISA and Luminex assays; ii) multiple assays can be achieved simultaneously on a single protein analyte; iii) continuous on-line molecular recognition monitoring is possible; and iv) a conserved region in the proteoform family is used as a built-in internal standard against which the concentration of variable structure domains are compared. This is especially important in the analysis of monoclonal antibodies (mAbs). Many of the critical structure attributes (CSAs) being targeted for analysis in the mAb are also in the sequestering antibodies. Fluorescent labeled mAb affinity selectors would be bound to both the sorbent and mAb, precluding structure attribute quantification in the mAb analyte.

The FDA directive published in 1987 states that therapeutic protein manufacturing should be continuously validated by critical quality attribute (CQA) monitoring; the rationale being that structural features of a therapeutic protein define both efficacy and adverse effects. Although liquid chromatography-mass spectrometry (LC-MS) is widely used in final mAb product analysis, it is not the best choice for continuous process validation (CPV). Structure analysis by LC-MS requires extensive sample preparation, the rate of proteolysis is structure dependent and varies between proteoforms, and substantial interpretation of spectra is necessary to identify critical structure attributes (CSAs). A further complication is the necessity in CPV for analyses of multiple proteoforms at hourly intervals. Neither LC-MS based analytics nor immunological assays can meet these requirements. The molecular recognition-based assay platforms and methods presented here avoid these issues.

The present disclosure describes analytical platforms (FIG. 1) and methods (FIG. 2) for continuous quality validation (CQV). The analytical platforms for CPV presented herein automate sample preparation, simultaneous critical structure attribute (CSA) analytics, data acquisition, and data analysis at the point of therapeutic protein production; the purpose being to minimize human error and analysis time. Moreover, the systems are designed to provide these analytical functions within the time-window needed for data-dependent decision-making (DDDM) in quality control during manufacturing. Although the chromatographic, electrophoretic, immunological, and mass spectral (MS) assays noted above are widely used to recognize and identify CSAs in proteins, they fail to match the DDDM performance of the systems and methods described herein.

One embodiment of the present disclosure involves the steps of:
a) providing a stream of one or more biological samples from which cells and cell debris have been removed,
b) selecting a secondary affinity selector ($*S_{as}$) for pre-column loading (FIG. 1, Sector 1),
  i) the preferred $*S_{as}$ selector being a peptide, a binding protein, an affimer, an aptamer, a phage display protein, or some other structure recognition specie,
  ii) the $*S_{as}$ selector having a covalently attached moiety that enhances detection by absorbance, fluorescence, chemi-luminescence, some other optical property, electrochemical properties, or enzyme amplification,
  iii) the $*S_{as}$ selector binding to a specific critical structure attribute (CSA) by intermolecular complementarity, or by covalent binding to a unique functional group within the CSA;
c) simultaneously introducing a sample stream and requisite $*S_{as}$ affinity selector(s) through a micro-volume mixer into a precolumn in Sector 1 (FIG. 1);
d) incubating the sample and secondary affinity selector ($*S_{as}$) in the precolumn for a fixed time at a specific temperature, during which an analyte:affinity selector complex (mAb:$*S_{as}$), referred to herein as a "luminon", is formed in the precolumn;
e) transporting the luminon into a size exclusion chromatography (SEC) column in Sector 2 by a mobile phase,
f) wherein the mobile phase may be: i) a buffer alone; or ii) contain a sequestron ($N_c\sim P_{as}$),
  i) when the mobile phase is a buffer the luminon complex and unused secondary affinity selector are resolved in the Sector 2 SEC column before transport to Sector 3 for detection,
  ii) luminon transport in the SEC column is followed by a sequestron zone of higher linear velocity, causing it to overtake and mix with the luminon ($A_n$:$*S_{as}$) complex,
g) when mixed, the sequestron ($N_c\sim P_{as}$) and $A_n$:$*S_{as}$ complexes form a sequestome ($N_c\sim P_{as}$:$A_n$:$*S_{as}$) complex,
h) the sequestome will continue migration through the SEC column in the void volume during which it will be resolved from residual reagents and non-analytes in the sample,
i) as the purified sequestome ($N_c\sim P_{as}$:mAb:$*S_{as}$) complex is eluted from the SEC column it passes into either Sector 3 or Sector 4, i. direct transport into Sector 3 is used to detect a chromophore or fluorophore in the secondary affinity selector, ii. elution of an $N_c\sim P_{as}:A_n:*S_{as}\sim E$ complex is directed into Sector 4 where a substrate is added that allows enzyme (~E) amplification before passing the resulting product to Sector 3 for detection;

j) data derived from the Sector 3 detector is used to identify and quantify critical structure attributes of proteoforms; and k) data from chronological assays of multiple CSA can be is used to develop a CSA ratio plot that provides continuous process validation.

A further embodiment of the present disclosure involves the steps of:

a) providing a biological sample(s) from which cells and cell debris have been removed;

b) selecting a Sector 2 liquid chromatography column into which the sample will be introduced;

c) selecting a mobile phase combination that upon gradient elution will cause maximum resolution of proteoforms in the combination;

d) providing a mixed sample and affinity selector with an appended detection enhancer for introduction through a micro-volume mixer into a precolumn;

e) incubating the mixture in the precolumn to allow analyte:affinity selector complexation (i.e., luminon formation);

f) transporting the complex into an analytical column in Sector 2;

g) analytes are eluted from the column without affinity selector desorption;

h) passing the column effluent through a fluorescence detector;

i) differentiating analytes from non-analytes through the difference in their spectral properties.

Still other embodiments of the analytical systems and methods describe above will be apparent to one skilled in the art. The inventive subject matter, therefore, is not to be restricted in the spirit of the disclosure. Moreover, alternative analytical applications should be interpreted in the broadest possible manner consistent with the context. Terms used herein should be interpreted as referring to an integrated system, elements thereof, or steps in a non-exclusive manner, indicating that the referenced elements, components, or steps may be present, utilized, deleted, or combined with other elements, components, or steps that are not expressly referenced. Examples include:

a) systems described herein for the analysis of proteins and proteoforms thereof in a wide variety of applications beyond process monitoring, clinical diagnostics and alternatives to western blotting being examples;

b) use of sequestrons to complex and transport non-analytes to positions in chromatograms where they do not interfere with analyte detection;

c) use of sequestrons to extract analyte(s) from a sample stream using a tangential flow filtration system, non-analytes being transported through the filtration membrane;

d) formation and resolution of the sequestome in the SEC column based on differences in the linear velocity of analytes, secondary affinity selectors, sequestrons, or the sequestome complex;

e) use of sequestron nanoparticles, secondary affinity selectors, and the detection means in the present disclosure with Luminex analyzers;

f) use of luminon reagents with sequestrons to form affinity complexes that are resolved by size exclusion or some other form of liquid chromatography;

g) affinity selectors that enable simultaneous analysis of a set of proteoforms within a family, different proteoform families, or non-polypeptide analytes such as polynucleotides;

h) very small primary affinity selectors and very large secondary affinity selectors, essentially reversing the sizing mechanism described above;

i) other types of liquid chromatography detection such as refractive index, electrochemical methods, or surface plasmon resonance;

j) monolith and microfabricated pillar type (collocated monolith structure) columns for the requisite reaction and separation steps in the present disclosure;

k) microfabricated systems that use sequestrons with miniaturized analytical systems;

l) electro-osmotic flow (EOF) as an alternative means to transport or mix reagents, sequestrons, and sequestomes in chip-based systems;

m) voltage switching between channels in microfabricated systems to circumvent the need for mechanical valves;

n) oscillating flow to achieve mixing and reactions in very short columns;

o) differing orders of analyte reagent reaction and introduction into the down-stream molecular SEC column; and p) different sample sizes to alter analyte detection sensitivity;

q) in the case where the analyte is virus, the primary affinity selector is an antibody or oligonucleotide, and the fluorescent labeled secondary affinity selector is an antibody or oligonucleotide.

In one aspect of the present disclosure, a method is provided to simultaneously identify and quantify critical structure attributes (CSAs) in proteoforms or proteoform families through multiple affinity selector sequestration and resolution in a size exclusion chromatography system. The method includes the steps of:

sequentially sampling sample streams at predetermined time intervals;

continuously adding a stream of one or more detection enhanced molecular recognition reagents to the reagent stream;

injecting a sample into the molecular recognition reagent stream;

incubating the combined sample:reagent(s) during migration through an analytical platform that causes molecular recognition reagent(s) to be sequestered by a specific critical structure attribute (CSA) in the analyte to form a luminon $(A_n:*S_{as})$ complex;

using a sequestron selector in the reagent stream to overtake the luminon complex in a down-stream size exclusion chromatography (SEC) column to achieve mixing and formation of an $N_c\sim P_{as}:A_n:*S_{as}$, $P_{as}:A_n:*S_{as}$, or $*P_{as}:A_n:*S_{as}$ sequestome complex;

resolving this sequestome complex from any unbound affinity selector(s) such as $*S_{as}$ or $*P_{as}$, and non-analytes in the SEC column;

transporting the resolved sequestome complex into a flow-through detection means that detects and quantifies critical structure attributes (CSAs) in fluorescent labeled $*S_{as}$ or $*P_{as}$ bearing luminon or sequestome complex to generate data for the construction of critical structure attribute ratio plots as a function of elapsed fermentation time.

DETAILED DESCRIPTION

Figure 1:
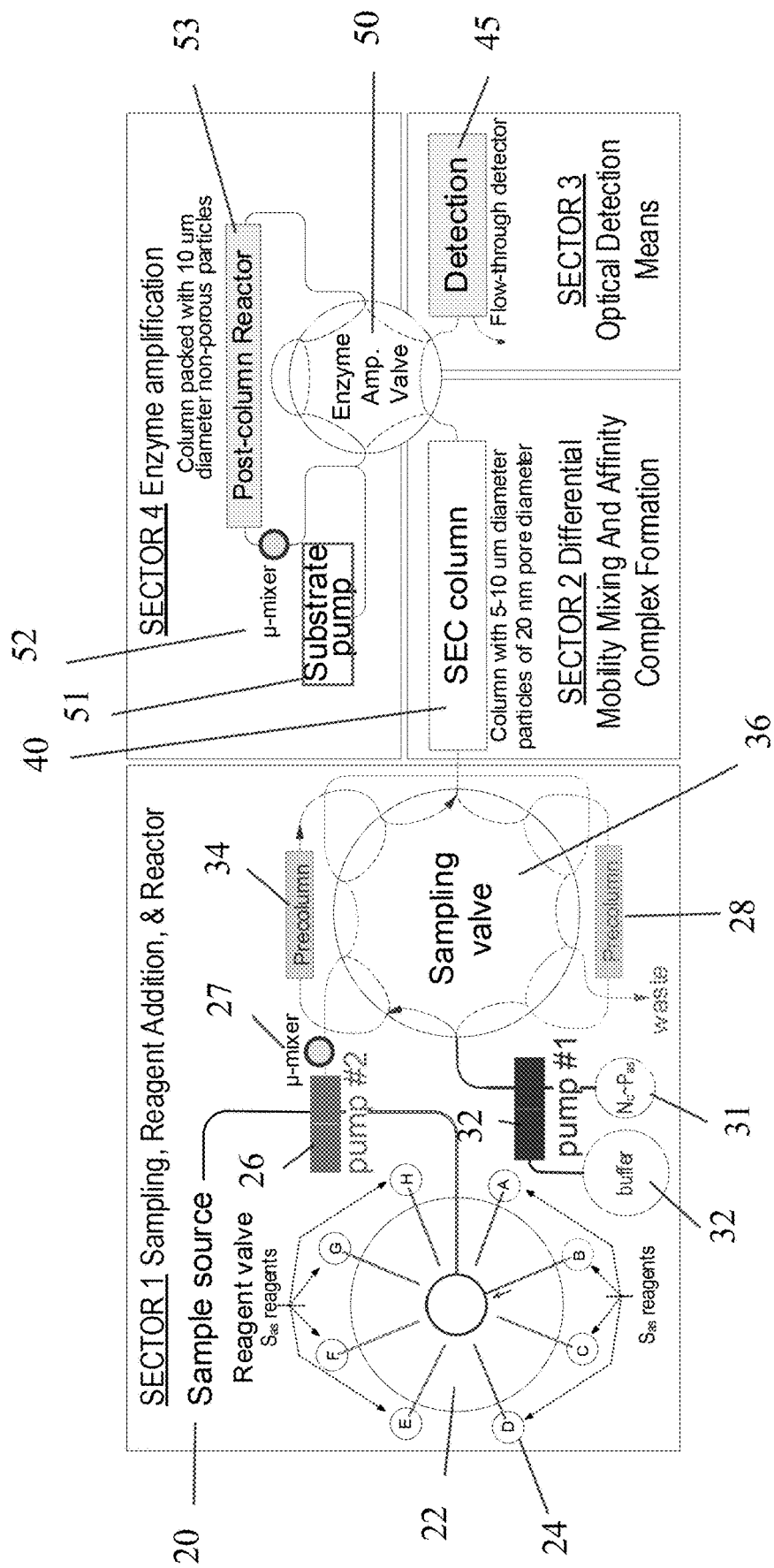
FIG. 1 is a diagram of a cumulative step proteoform (CUSP) monitoring system capable of critical structure attribute (CSA) detection by absorbance, fluorescence, or enzyme amplification methods, according to the present disclosure.

As will be appreciated by one skilled in the relevant art, the present disclosure is not limited to the various iterations and embodiments of the methods within the analytical platforms presented below, or to the specific order of steps in their methods of use. Nor is it restricted to the platform configurations described.

Terms used herein are not intended to limit the scope of the disclosure except as specifically stated in the claims. Their meaning is as commonly understood unless otherwise defined.

Variations in the field of use, number of CSAs being measured, steps, and the order in which various steps are performed in various embodiments fall within the scope of the claimed disclosure. Clearly the system and methods described in the present disclosure will be of value in other fields involving protein or virus analysis. It will be understood by one skilled in the relevant art that multiple embodiments of this system will accomplish the stated specific aims of a continuous monitoring system. Optionally the platform shown in FIG. 1 can be simultaneously loaded with one or more internal standards, derivatizing agents, digesting agents, sequestrons or luminons, prior to, during, or after sample addition and perform other types of analyses within the scope and spirit of various versions of the present disclosure.

Monoclonal antibodies (mAbs) will be used in examples to demonstrate the broad utility of the analytical platforms and methods for continuous process validation described herein.

Definition of Terms

The term "protein" or "recombinant protein" as used in the present disclosure refers to a polypeptide species of either natural origin or expression by genetic manipulation. It will be understood by those skilled in the art that a protein species can belong to a family of very similar structural variants, i.e., "proteoforms" or a "proteoform family". It is significant that multiple affinity selection, resolution, and quantification assays described here are not previously anticipated in mobile affinity sorbent chromatography (MASC).

"CSA data prerequisite" refers to the amount of CSA data necessary for definitive critical quality attribute monitoring.

"Upstream monitoring" designates repetitive analyses of analytes obtained from a fermenter or culture filtrate. "Downstream monitoring" in contrast denotes analyses executed during purification and product formulation.

"Analyte" ($A_n$) as used herein refers to a protein or proteoform family, a virus, or polynucleotide bearing critical structure attributes that define product quality or efficacy. Proteoforms are genetically related proteins of similar structure found in a biologically expressed sample, including fermenter filtrate, without regard to whether they exist in the sample.

"Critical structure attributes" (CSAs) are the structural features of an analyte that define a proteoform family, relate to its therapeutic efficacy, define its biological activity, or identify its utility as a biomarker. Proteins have CSAs that may have a positive or negative impact on their function. CSAs that diminish biological activity, convey toxicity, or are immunogenic would be considered negative CSAs. In the case of therapeutic proteins, CSAs are a subclass of critical quality attributes (CQAs). (The definition of a CQA is found in FDA directives).

"Cumulative step proteoform" (CUSP) monitoring is the analytical process of identifying and quantifying proteoforms in either a "sequestome" ($N_c\sim P_{as}$:mAb:$*S_{as}$) or "luminon" (mAb:$*S_{as}$) complex during therapeutic protein production.

"Affinity selector" designates a molecular species that binds with high specificity to an analyte proteoform, proteoform family, or a critical structure attribute therein.

"Affinity sorbent transport particles" (ASTPs) are nanoparticles with an immobilized affinity selector that bind to an analyte and transport it through a chromatography column without interaction with a column stationary phase.

"Affimer" is a small protein or peptide that binds to another protein with high affinity.

"Aptamer" is an oligonuucleotide that binds to another molecule with high affinity.

"Selectivity" and "specificity" are used interchangeably herein, designating the relative degree to which an affinity selector differentiates between a proteoform, a proteoform family, polynucleotide, or a specific critical structure attribute relative to all other molecular structure attributes of proteins in a sample.

"Sample aliquot" refers to selection of a specific volume of sample or reagents in the analytical system precolumn for the purpose of executing a luminon or sequestome assay (FIG. 1).

"Internal standard" as used here is a conserved critical structure attribute of a proteoform family, a protein, or a single proteoform of known concentration that is like the analyte, the standard being used to quantify relative CSA ratios.

The terms "affinity based" and "ligand based" assays are used interchangeably in the present disclosure. These assays are of two types, the most common being the case where the affinity of a reagent for an analyte depends on their intermolecular complementarity. The second is instances in which the affinity reagent forms a covalent bond with the analyte at a specific critical structure attribute (CSA). All the affinity-based assays described here are of the multiple selection type except luminon assays, meaning two different analytical reagents bind at different sites within an analyte as a means of providing multiple levels of discrimination in identification and quantification.

"Primary affinity selectors" ($P_{as}$) recognizes and sequesters either a specific proteoform or a proteoform family based on a structure attributed in the analyte. The $P_{as}$ generally binds to a conserved domain in the analyte. In sequestome assays the $P_{as}$ is immobilized on the sequestron nanoparticle. A $P_{as}$ is not necessarily a conserved domain in luminon assays.

Figure 2:
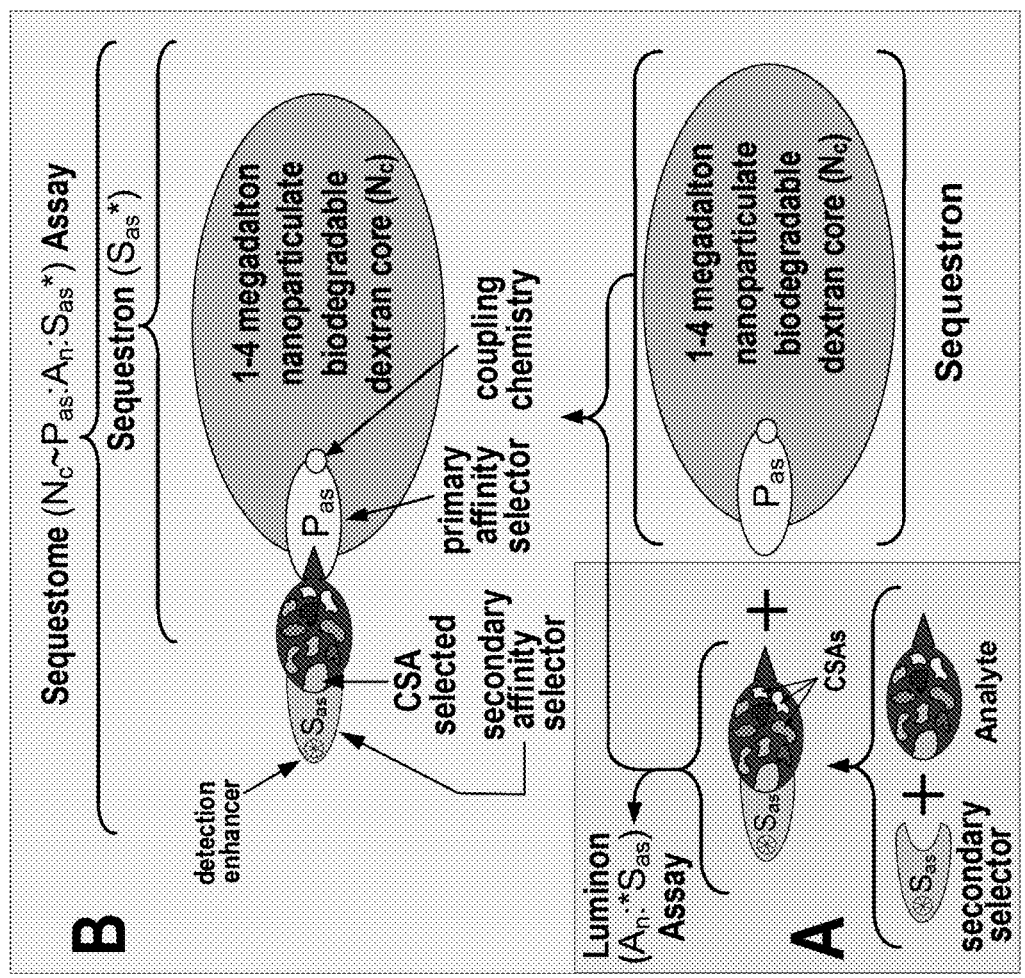
FIG. 2 is an illustration of the structure of luminon ($A_n*S_{as}$) and sequestome ($N_c\sim P_{as}$:mAb:$*S_{as}$) complex formation in the automated luminon and sequestome assay systems disclosed herein.

A "secondary affinity selector" ($*S_{as}$)" in the present disclosure is used to identify and quantify a critical structure attribute (CSA) through formation of an $A_n$:$*S_{as}$ (luminon) complex (FIG. 2). An $*S_{as}$ must have at least two enabling features to achieve this goal. One is that it must serve as a CSA reporter in detection. This is achieved by incorporating a unique structural moiety into the $*S_{as}$ that is fluorescent or has a high turnover number enzyme. In so doing it illuminates the CSA. That is the origin of the term "luminon". A second requirement is that it must have a high degree of molecular complementarity with the CSA, particularly at the level of analyte conformation or amino acid sequence. Detection of unique functional groups by covalent derivatization is another $*S_{as}$ function. The significance of unique functional groups in proteoforms is that they are often an environmentally dependent post-translational modification. The presence of carbonyl groups, sulfhydryl groups, or oxidized methionine residues in analytes are identified by specific functional groups.

The term "sequestron" ($N_c$~$P_{as}$) as used in the present disclosure refers to a hydrophilic nanoparticle of preferably 50 nm in diameter to which a primary affinity selector is covalently attached. It is also possible that the hydrophilic nanoparticle carries a secondary affinity selector ($*S_{as}$) instead of a $P_{as}$ but this is not preferred. Sequestrons are excluded from pore matrices <50 nm in diameter in the Sector 2 SEC column.

The "hydrophilic nanoparticle" at the sequestron core is preferably water-soluble and of several million Daltons.

A "sequestome" has the general form $N_c$~$(P_{as})_m(A_n)_n$: $(*S_{as})_o$ indicating that multiple (m) primary affinity ($P_{as}$) selectors can be bound to the particle core, (n) molecules of analyte ($A_n$) can be bound to the $P_{as}$, and (o) molecules of secondary affinity selector ($*S_{as}$) can bind to the analyte.

"CSA multiplexing" is used to describe the analysis of multiple types of critical structure attributes (CSAs) simultaneously. This is accomplished by using a different fluorophore with each secondary affinity selector. Using a fluorescence detector capable of detecting multiple fluorophores simultaneously enables multiple CSAs to be monitored in a single sample.

"Enzyme linked immunosorbent assay" (ELISA) is a classic technique in which a first antibody (~$Ab_1$) immobilized on a solid surface is used to capture an antigen (Ag) from a sample, forming a Solid~$^1$Ab:Ag complex. The sorbent is then exhaustively washed in a second step to remove non-antigens and non-specifically bound proteins from the Solid~$^1$Ab:Ag complex. The sorbent is further contacted in a third step with a second antigen specific antibody bearing a conjugated enzyme ($^2$Ab~E), forming the classic ELISA sandwich (Solid~$^1$Ab:Ag:$^2$Ab~E). The sandwich is washed extensively in a fourth step to remove unbound $^2$Ab~E. Substrate is added to the affinity selector complex in a fifth step with subsequent generation and amplification of a detectable product. Quantification is finally achieved in a sixth step.

"In-line monitoring" refers to continuous process validation on a filtered stream of effluent leaving a fermenter. Cell and particulate matter removal precede analytical platform sampling in all descriptions of at-line and in-line monitoring.

"At-line monitoring" differs from in-line monitoring in that samples are sequentially withdrawn from harvested culture medium and analyzed within the analytical time-window.

The term "fermentor" as used here designates the hardware used to execute fermentation while "fermenter" refers to a fermentor at work executing fermentation.

"Analysis-time-window" (ATW) is defined as the time required for an analytical measurement to be made.

"Data-dependent decision-making" (DDDM) refers to continuous process validation based on accumulated critical structure attribute data.

"Decision-time-window" (DTW) is the time within which a decision must be made to perform a function such as some form of process remediation before the decision becomes irrelevant. This is the time within which sufficient data must be collected to allow DDDM Critical Structure Attribute Assay Methods It is critical to recognize in the synthesis of therapeutic proteins by recombinant DNA technology that the protein product is composed of structurally variant proteoforms. Environmentally induced variations in protein expression cause critical structure attributes (CSAs) within product proteoforms to vary during production. Of great importance is that: i) multiple CSA analyses are involved in quality assessment; ii) some negatively impact quality; iii) increasing negative CSA ratios must be detected and quantified during production; iv) the negative variations must be corrected within a decision-time-window (DTW) to allow DDDM; and v) when quality varies to the extent remediation is impossible the production lot must be discarded.

Meeting the DTW requires: i) differentiating between product CSAs and those of thousands of other proteins in fermenter growth media; ii) executing the analyses on multiple CSA assays simultaneously; and iii) quantifying CSA ratio changes beyond defined process limits. That is accomplished by the systems and methods of the present disclosure in three ways. The first is to use molecular recognition of proteoforms and CSAs therein to accelerate the differentiation of analytes from other substances in samples. The second is to code each CSA affinity selector with a specific fluorophore. And the third is to identify and quantify these CSA specific fluorophores simultaneously with a multiple wavelength fluorescence detector. All depending on the enabling methods described below.

Proteoform Family Selection.

It is fortuitous that proteins have conserved structural domains common to the proteoform family within which they result. When immobilized on a nanoparticulate sequestron core ($N_c$), either protein L, protein A, F(ab')2 domain targeting polypeptide or aptamer affinity binding agents can be used as primary affinity selectors ($\sim P_{as}$) for monoclonal antibody (mAb) proteoform family sequestration (FIG. 2A). Other CSAs in an mAb family do not impact primary affinity selection. Constant region primary selection is used to capture an entire proteoform family. This approach is used to sequester all possible critical structure attributes in a proteoform family. All possible CSAs would be available on the sequestron for specific secondary affinity selector analysis.

An alternative approach is to use a variable critical structure attribute (vCSA) affinity selector as the primary affinity selector ($\sim P_{as}$) on the sequestron ($N_c\sim P_{as}$) and either a fluorescent labeled affimer, aptamer or Protein L as the secondary affinity selector. This approach was examined with high molecular weight lectins. A high molecular weight lectin is used to target the variable CSA in the analyte protein while a low molecular weight affinity selector is sequestered by a constant region CSA. The disadvantage of this approach is that a host-cell protein can have some of the same variable CSAs as those being targeted in the mAb proteoforms.

Proteoform Specific CSA Assay Protocols.

Critical structure attribute (CSA) identification and quantification is achieved in both the luminon (FIG. 2A) and sequestome (FIG. 2B) assay formats. It has been demonstrated in mobile affinity sorbent chromatography (MASC) that high affinity sorbent transport particles (ASTPs) with an immobilized antibody bind antigen(s) and causes them to elute in the void volume of size exclusion chromatography (SEC) columns without penetrating sorbent pores. An advantage of this approach relative to affinity chromatography is that an antigen is affinity selected, purified, and transported through a chromatography column without the need for analyte desorption from the sorbent surface of an affinity column and column recycling. Both are required in affinity chromatography. Disadvantages of MASC are that detection can require analyte desorption and that assays are based on the use of antibody affinity selectors. This is also a limitation of affinity chromatography.

The systems and methods disclosed herein extend the utility of MASC by: i) use of non-antibody affinity selectors in targeting critical structure attributes (CSAs); ii) circumventing the need for analyte desorption in detection; and iii) simultaneous recognition and quantification of multiple CSAs within an affinity selected analyte.

Sequestome Assays.

The first step in sequestome assays is molecular recognition and association of a specific secondary affinity selector (*$S_{as}$) bearing a detection enhancer (*) with a critical structure attribute (CSA) in an analyte. The resulting luminon (mAb:*$S_{as}$) complex is illustrated in FIG. 2A. (*$S_{as}$ is a general symbol that does not communicate that a unique affinity selector ($S_{as}$) and fluorophore (*) are used for each type of CSA.) Luminon complex formation occurs by either intermolecular complementarity or covalent bond formation. Because covalent bonding can require up to 15 min, this is the slowest step in a sequestome assay. This problem is avoided by parallel luminon formation (FIG. 1) in a Sector 1 precolumn 28, 34. During luminon formation, the second step of a previous sample analysis is executed in Sector 2 of the analytical platform shown in FIG. 1. This out-of-phase parallel processing increases analytical throughput. The two assays could even differ in the requisite method.

Among the many types of critical structure attributes (CSAs) in a proteoform family, some are acquired by post-translational modifications commonly found in unrelated proteoform families. Both analytes and non-analytes will be *$S_{as}$ labeled in this case. The preferred method of eliminating non-analyte *$S_{as}$ detection in assays is to use a sequestron in the second step of the assay (FIG. 2) with a primary affinity selector specific for luminon complexes bearing a conserved CSA unique to the mAb being assayed. The sequestome in this case is the $N_c\sim P_{as}$:mAb:*$S_{as}$ sandwich illustrated in FIG. 2B.

At completion of sequestome complex formation, excess *$S_{as}$ reagent, non-analytes labeled with the *$S_{as}$ reagent, and non-analytes remaining in the reaction mixture are resolved in an SEC column 40 in Sector 2 of the system of FIG. 1, before sequestome transport to Sector 3 for detection. Detection in Sector 3 is achieved with a flow-through fluorescence or absorbance detector 45 capable of detecting the unique spectral properties of fluorophore labeling agents.

Beyond process monitoring, mAb titer analysis is also an important part of process development; particularly in rapid cell-line screening, clone selection, and identification of variables that impact mAb expression and quality. Complicating mAb titer assays in both process development and continuous process validation is the fact that harvested growth medium can contain a thousand or more host-cell proteins (HCPs). This requires differentiation between mAb product proteoforms and HCPs in detection. That is an asset of sequestome assays.

A sequestome titer assay is designed for this purpose using the analytical platform in FIG. 1 and the National Institute of Standards and Technology (NIST) mAb as an analyte standard. Samples can be prepared by blending NIST mAb of varying concentration with mAb free fermenter filtrate containing host-cell proteins equivalent to the concentration found midway through an mAb production run.

Primary and secondary affinity selectors are chosen that bind to conserved structure and variable domains of the NIST mAbs, respectively. One design objective is to universally sequester and purify all mAb proteoforms via the primary affinity selector, irrespective of variable structure domains being targeted. A sequestron ($N_c\sim P_{as}$) used to sequester the mAb:*$S_{as}$ luminon complex is fabricated using a protein A primary affinity selector ($P_{as}$) linked to a nanoparticulate carboxymethyl dextran ($N_c$) core. Protein A is chosen as the primary affinity selector based on its selectivity for the constant Fc structure domain in mAbs.

Figure 3:
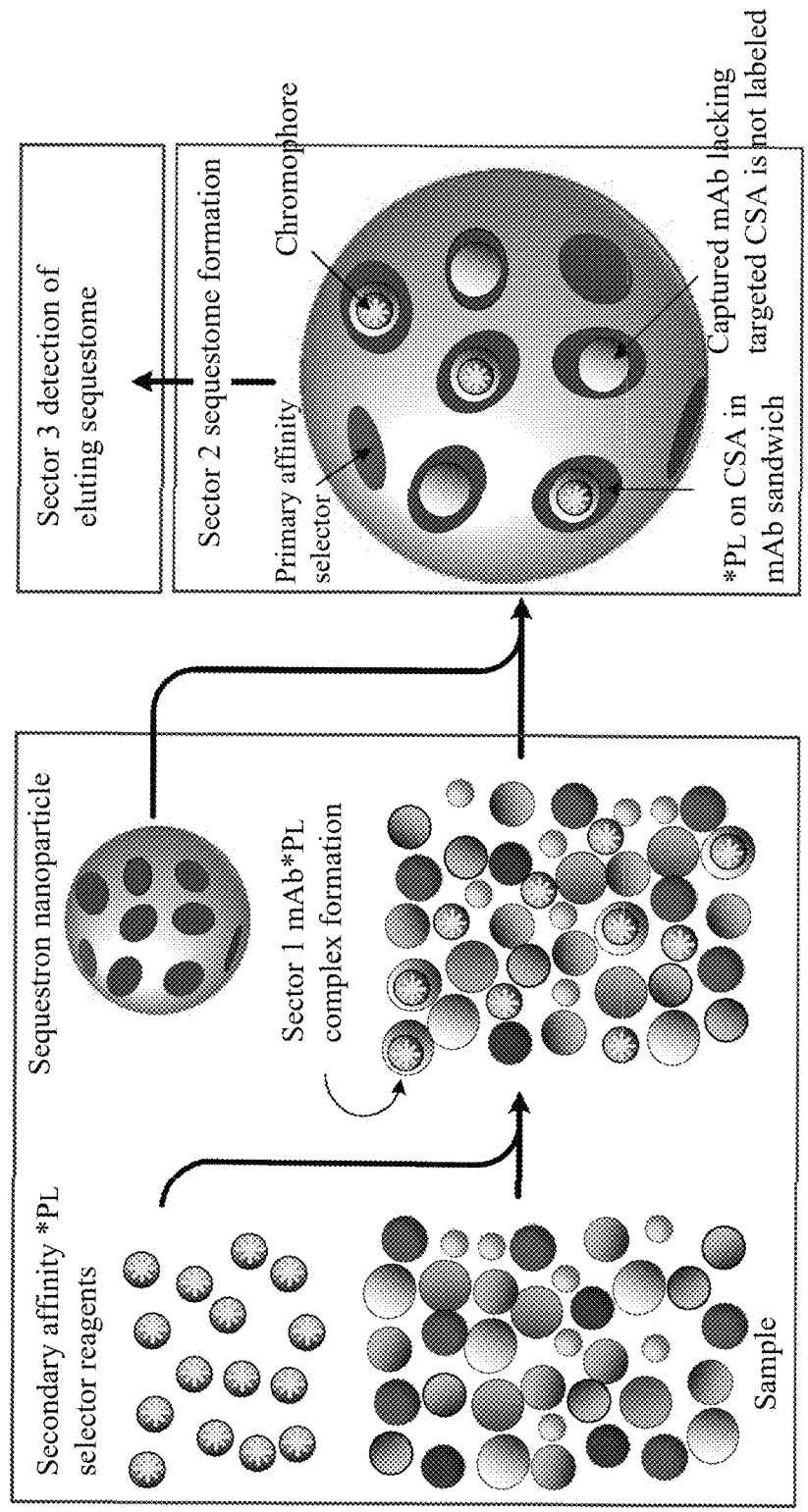
FIG. 3 is an illustration of the steps leading up to sequestome formation and resolution in the SEC column of the system shown in FIG. 1.
Figures 4A, 4B:
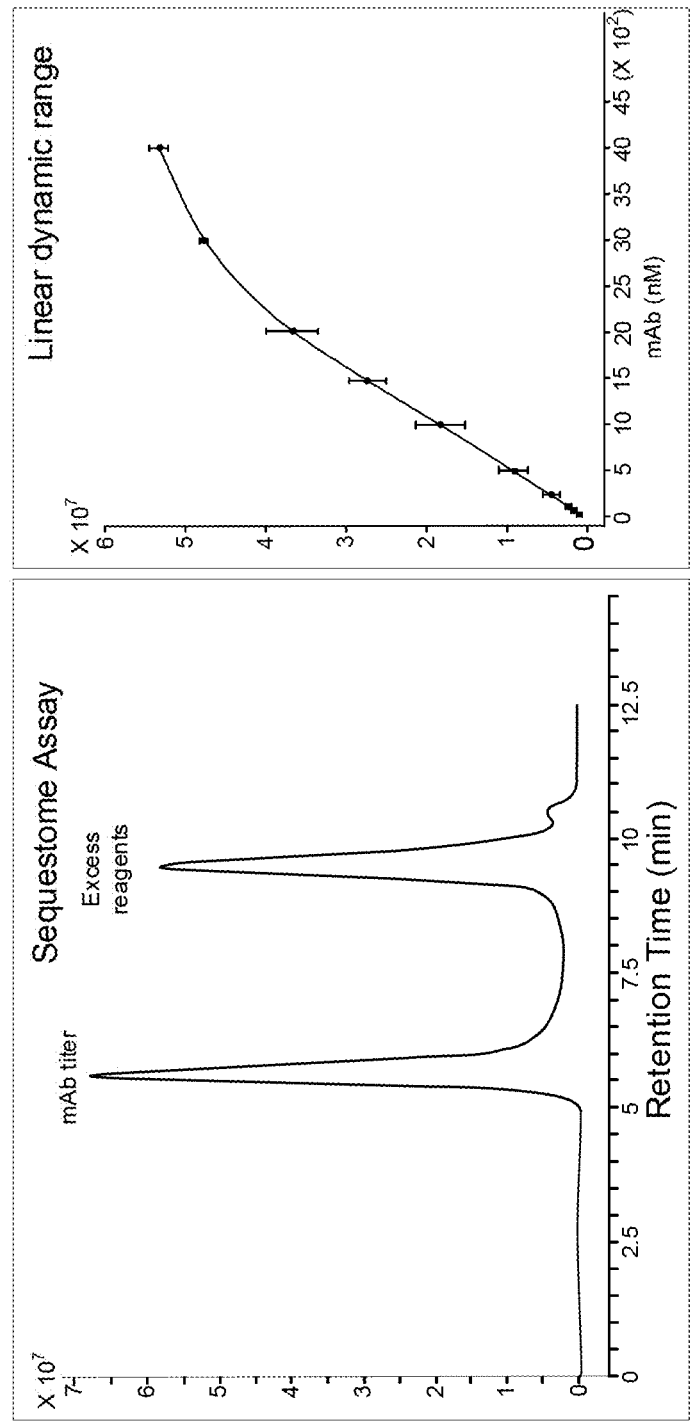
FIGS. 4A and 4B are graphs of a sequestome assay of the mAb titer in samples bearing a known concentration of NIST mAb standard.

The mAb:*$P_L$ luminon, depicted in FIGS. 2 and 3, is formed by incubating NIST-mAb bearing samples with the FITC labeled protein L secondary affinity selector (*$P_L$) in a precolumn 28, 34 of Sector 1. Luminon thus formed is displaced from the precolumn into the Sector 2 size exclusion chromatography (SEC) column 40 by buffer bearing the $N_c\sim P_A$ sequestron (FIG. 3). (The symbol $P_A$ represents protein A.) Based on their order of entry into the Sector 2 SEC column (FIG. 1) and the higher linear velocity of the sequestron in a 35 to 50 nm pore diameter column, the luminon and sequestron mix form a sequestome ($N_c\sim P_A$:mAb:*$P_L$) complex of approximately 2 mDa. Luminon complex formation with the NIST antibody can occur within a minute after mixing. The very short diffusion distance between the sequestron nanoparticles and luminon complex are thought to reduce the time required for sequestome formation. Upon elution from the SEC column the sequestome is transported into a flow-through detector 45 in Sector 3 where the fluorescent labeled protein L affinity selector in co-eluting proteoforms is detected. Total analysis time can be ~10 min with a 100-fold linear dynamic range (FIGS. 4A, 4B).

One advantage of the sequestome assay is the ease and speed with which a proteoform family can be resolved from non-analytes. A disadvantage is that it did not discriminate between mAb aggregates.

Although both the primary and secondary affinity selectors in the above mAb titer assay are selected to targeted conserved structure domains, which will often not be the case. When variable critical structure attributes (CSAs) are being analyzed the primary affinity selector sequesters a conserved CSA and the fluorescent labeled secondary affinity selector is chosen to select a variable CSA. This can be demonstrated with high molecular weight lectins. The primary affinity selector is a lectin while the secondary affinity selector is a fluorescent labeled, low molecular weight constant region affinity selector ($*S_{as}$). $*S_{as}$ is a proprietary fluorescent labeled peptide that binds in the $F_c$ region. The lectin:mAb:$*S_{as}$ and mAb:$*S_{as}$ conjugates are separated by SEC and quantified individually. The mAb titer is the sum of the conjugate peaks while lectin complex relative peak area alone reveals the amount of the glycan CSA affinity selected by the lectin.

Luminon Assays.

With the analytical platform in FIG. 1 the sequestome and luminon assays both start with formation of the luminon (mAb:$*S_{as}$) complex; differing only in the second dimension of analysis. Luminon assays are achieved with a single affinity selector, generally a secondary affinity selector ($*S_{as}$). The preferred affinity selector in this case is again the proprietary fluorescent labeled peptide ($*P_{ep}$) that binds in the Fc region. The rationale in using a peptide affinity selector in luminon assays is that it would be much smaller than the mAb, be of lower linear velocity than the mAb in an SEC column and cause little change in the SEC retention time of the mAb or a complex thereof.

Figure 5:
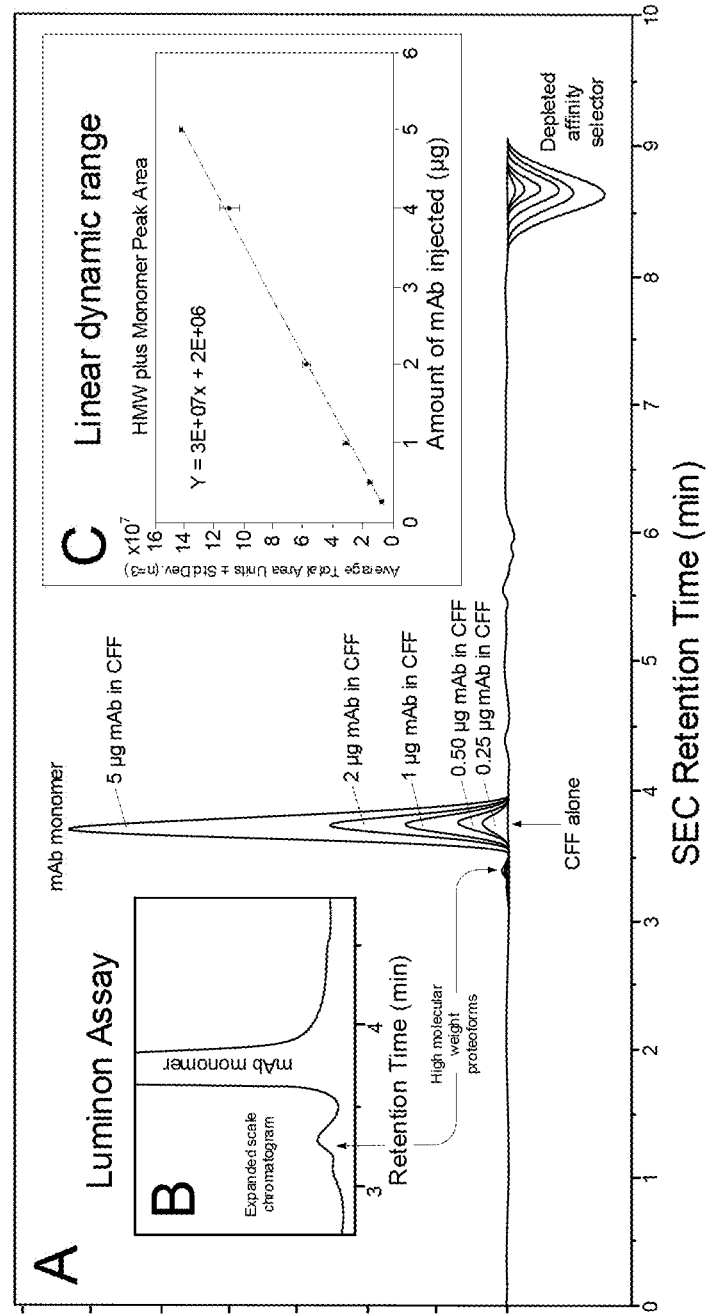
FIG. 5 includes graphs of a luminon assay of mAb aggregation and titer achieved in a continuous affinity selector flow mode of the system shown in FIG. 1. The primary affinity selector is labeled with fluorescein isothiocyanate. "CFF alone" refers here to a crossflow filtered sample lacking mAb. Note the absence of HCP peaks.

When the above NIST mAb samples are injected into a continuous stream of fluorescent labeled peptide ($*P_{ep}$), as the mobile phase enters the SEC column the mAb zone rapidly overtakes and mixes with the peptide affinity selector, forming mAb: $*P_{ep}$ luminon complexes bearing both monomer and aggregated forms of the mAb. As unused reagents and mAb complexes proceed through the SEC column they are separated according to their molecular weight (FIG. 5). The negative peak in the chromatogram of FIG. 5 results from the slower moving residual $*P_{ep}$, not sequestered by mAb proteoforms. The assay can be achieved in 10 minutes through fluorescence detection of the $*P_{ep}$ selector in the mAb:$*P_{ep}$ complexes with a 30-fold linear dynamic range.

The fact that a thousand or more host-cell proteins are undetected in the FIG. 5 chromatogram attests to the substantial detection selectivity of the luminon assay. Three features of the mAb are assayed simultaneously: the degree of aggregation, absolute mAb concentration, and concentration ratios of the monomer, dimer, and trimer. This is a major asset of the luminon assay.

The critical structure attribute (CSA) labeled by the secondary affinity selector in luminon assays should only be present in the proteoform analyte to afford high selectivity detection. CSA assays involving post-translational modifications found in many host-cell proteins will appear in luminon assay chromatograms, making it difficult to differentiate between m Ab proteoforms and HCPs.

PTM Modification CSA Assays.

Critical structure attributes (CSAs) of proteoforms frequently result from post-translational modifications (PTMs). Oxidation, phosphorylation, acylation, glycosylation, and glycation are among the more common critical structure attributes introduced by PTMs. Because these modifications are widely distributed across the proteome of an organisms, sequestome assays are the preferred method of PTM analysis.

With monoclonal antibodies the preferred primary affinity selector in the sequestome assay are protein A or protein L while the fluorescent labeled secondary affinity selector are a fluorescent labeled peptide, antibody, affimer, aptamer, or proteins that specifically targets the PTM. A fluorescent labeled lectin provides a PTM type of affinity selection for specific types of glycosylation. Fluorescent labeled antibodies can also be used as PTM affinity selectors. PTM derivatization can also be achieved by covalent modification.

Carbonylation as an Example.

Protein oxidation is a typical example of a post-translational modification (PTM). Oxidative stress is linked with production of reactive oxygen species (ROS), a major factor of cellular aging. When cellular antioxidant defenses are overwhelmed by ROS, cellular proteins undergo amino acid oxidation with accompanying aldehyde and ketone formation. A new set of critical structure attributes is created that collectively alter the biological activity of proteins in multiple ways. One is by promoting aggregation. Another is loss of biological function by conformational alterations and active site modifications in general.

The assay of carbonylation can be chosen as an example of a sequestome assay of a PTM best assayed by covalent derivatization of an acquired critical structure attribute. A sequestome assay can be chosen as the method of choice because host-cell proteins also undergo carbonylation under oxidative stress.

The carbonylation assay started with derivatization of aldehydes and ketones; using Alexa Fluor™ 488 hydroxylamine as the secondary sequestering agent. Derivatization proceeds readily at pH 7. Alexa Fluor™ 488 carries multiple negative charges, is water soluble, and pH-insensitive from pH 4 to pH 10. Catalysts such as 3,5-diaminobenzoic acid or p-phenylenediamine accelerate derivatization under neutral and more basic conditions. This green-fluorescent dye is ideally suited for excitation at 488 nm. Emission wavelengths are at 493 and 517 nm.

Beyond the specificity of the derivatization reaction, the size exclusion chromatogram from the assay is the same as that seen in FIGS. 4A, 4B. In fact, the analytical platform, the methods, and all sequestome assay data can be the same in most post-translational modification assays. The chromatograms have two peak clusters that elute from the SEC column within 10 minutes. The first peak is that of the sequestome, eluting in the column void volume and the second cluster is excess primary affinity selector and derivatized non-analytes.

Simultaneous Assays of Multiple CSAs.

It is important in continuous process validation that sufficient critical structure attribute data be collected within the decision-time-window to allow process remediation. That requires analysis of multiple critical structure attributes.

Figure 6:
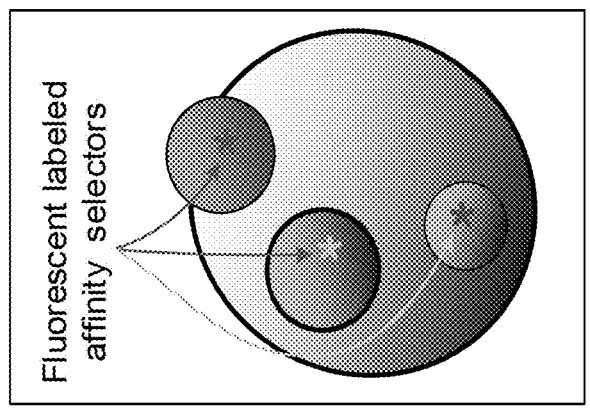
FIG. 6 is a diagram showing the possibility that a single molecule can capture and allow multiple critical structure attributes (CSAs) to be detected and quantified simultaneously. CSA assessment at any site is independent of CSA detection at another site.

The mAb titer and aggregation assays in FIG. 5 are expanded to include simultaneous carbonylation and free sulfhydryl assays and the platform incubation column at 40° C. 3,5-Diaminobenzoic acid is added to accelerate carbonyl and sulfhydryl derivatization. The Fc region of the mAb was targeted with a fluorescent labeled peptide while carbonyl groups were derivatized with Alexa Fluor™ 488 hydroxylamine and sulfhydryl groups with BP Fluor 647 C™ maleimide dye, respectively. As illustrated in FIG. 6, four different critical structure attributes of the NIST mAb are monitored simultaneously, i) the mAb titer, ii) mAb aggregation, iii) carbonylation, and iv) free sulfhydryl assay concentration in a single luminon assay. FIG. 6 is a diagram showing the possibility that a single molecule can capture and allow multiple critical structure attributes (CSAs) to be detected and quantified simultaneously. CSA assessment at any site is independent of CSA detection at another site. Clearly the concentration of a CSA affinity selector must exceed that of the CSA being determined. Each affinity selector species must be labeled with a different fluorophore in this assay mode. The number of CSA species that can be detected simultaneously is limited by the detector and the emission bandwidth of the fluorophores being used in the assays.

Host-cell Protein Removal.

Host-cell proteins (HCPs) and polynucleotides frequently coelute with monoclonal antibodies (mAbs) in multiple types of liquid chromatography (LC). Direct LC analysis of mAbs in harvested fermenter broth is precluded. This problem is widely addressed by first purifying the mAb proteoform family with protein A affinity chromatography. After elution with an acidic mobile phase the effluent must be pH adjusted before further modes of analysis can be applied.

The rationale in the present disclosure is to circumvent protein A affinity chromatographic removal of HCPs by using sequestome chromatography. The primary affinity selector ($\sim P_{as}$) used in this approach is a sequestron with an immobilized polyclonal antibody ($pAb_{hcp}$) that binds HCPs in general. The resulting $N_c$~$pAb_{hcp}$ sequestron binds approximately 90% of the host-cell proteins in fermenter samples, causing the bulk of HCPs to elute in the void volume of a size exclusion chromatography (SEC) column. Precolumn incubation of samples with $N_c$~$pAb_{hcp}$, DNase, and RNase in the Sector 1 precolumn sequestered HCPs in a ~2 mDa $N_c$~$pAb_{hcp}$:HCP complex, while DNA and RNA species were converted to low molecular weight oligonucleotides. When subjected to SEC in a 30 nm pore diameter column the $N_c$~$pAb_{hcp}$:HCP complex eluted in the void volume while the oligonucleotides eluted with low molecular weight species. This approach creates an SEC elution window within which mAbs are detected directly without column recycling. Again, analysis times are in the range of 10 min.

Analytical Platforms.

The designed-for-purpose analytical platform shown in FIG. 1 is used to automatically analyze critical structure attributes (CSAs) in proteoforms by molecular recognition. One design rationale is to integrate sample and analytical reagent selection, sample preparation, CSA differentiation, data analysis, and CSA ratio determination during therapeutic protein production as a prerequisite for critical quality assessment in continuous process validation.

The preferred method for sequestome formation is a two-step process in which a protein analyte ($A_n$) bearing sample 20 and secondary affinity selectors (*$S_{as}$) 24 are mixed and incubated in a Sector 1 precolumn 34; resulting in formation of a luminon ($A_n$:*$S_{as}$) complex at outlet line 35 (FIG. 1). This accommodates cases where Luminon formation involving covalent bond formation is slower than sequestome formation. For this reason, the SEC component is executed independent from sequestome formation. This allows the two steps in sample preparation to be achieved in parallel. This increases throughput and decreases analysis time. The Sector 1 precolumn diameter can range from 0.1 to 4.6 mm with lengths of 10 to 300 mm, depending on sample size. The preferred volume of the Sector 1 precolumn column preferably does not exceed 10% of the Sector 2 SEC column.

Non-analyte proteins also complex fluorescent labeled secondary affinity selectors (*$S_{as}$) by multiple mechanisms; one being by molecular recognition and another by non-specific binding. Both are separated from mAb:*$S_{as}$ complexes in Sector 2 after sequestome formation in the FIG. 1 platform.

At-Line Platform.

Differentiating features of this assay platform are in causing: i) critical structure attributes (CSAs) of interest in an analyte ($A_n$) such as a monoclonal antibody to be sequester by a detection enhancing secondary affinity selector (*$S_{as}$) to form a luminon complex (mAb:*$S_{as}$); ii) a proteoform family thus labeled to be resolved and detect directly or sequestered by a primary affinity selector ($P_{as}$) on a nanoparticle sorbent medium to form a sequestome complex ($N_c$~$P_{as}$:mAb:*$S_{as}$); iii) luminons and sequestomes thus sequestered to separate from non-analyte species, and iv) detection enhanced CSAs in these complexes to be identified and quantified either individually or in groups. The preferred platform configuration is illustrated in FIG. 1. As one sample is being loaded from the sample source 20 and incubated in one of two precolumns 28, 34, the other sample is being eluted into the SEC column 40. Any one of multiple sample sources can be coupled to the monitoring system directly or through a reagent valve 22. The position selected on the reagent valve 22 allows binary "pump #1" 32 to transport mobile phase containing sequestron ($N_c$~$P_{as}$) directly into the SEC column 40 in Sector 2 of the system, while binary "pump #2" 26 is loading the other precolumn 34 with secondary affinity selectors (*$S_{as}$) 24 or mixtures of primary ($P_{as}$) 31 and $S_{as}$ affinity selectors of choice. Binary pumps are used to enable sampling from either of two sources.

Sector 1. The primary function of Sector 1 in the FIG. 1 is sample and reagent selection, initiation of sample preparation, and mAb: $P_{as}$ complex formation. Although the illustration implies sampling occurs from a single source, sampling can be achieved from multiple sources 20.

Recognizing it is necessary in critical quality assessment to analyze multiple critical structure attributes (CSAs), a switching valve 22 is incorporated into Sector 1 to enable sampling from eight different sets (A-H) of CSA reagents 24. Reagents thus selected are mixed with samples by binary pump #2 26, with the flow rate from the reagent source being determined by the reagent to sample split-ratio. Beyond single CSA assays, this configuration enables simultaneous analysis of multiple CSAs. Reagent carryover between samples is circumvented by purging reagent transfer lines to waste while a prior sample is being analyzed in Sector 2.

The sample-to-reagent volume ratio in an assay is a function of the detection limits and linear dynamic range (LDR) of an assay relative to the CSA concentration in the sample stream. Knowing both the limit of detection and the LDR of an assay the reagent to sample volume ratio is determined experimentally holding reagent volume constant. That ratio can be determined in the present disclosure with the pumping system. Based on the ability to vary pumping rate in UHPLC pumping systems, reagent pumping rate is held constant while sampling flow rate is varied. In this way pumping system flow rates are used to determine the optimum reagent-to-sample volume ratio. When optimized, the reagent-to-sample flow rate ratio for each CSA assay is entered into the method software of the UHPLC.

Mixing in the present disclosure is accomplished with a static, microvolume mixer 27 and by differences in the linear velocity of analytes and reagents in the SEC column. Rapid mixing in molecular recognition assays minimizes band spreading.

Beyond sample preparation, another objective in Sector 1 is the formation of an mAb:*$S_{as}$ complex in which the analyte ($A_n$) is a proteoform family and *$S_{as}$ is a fluorescent labeled secondary affinity selector (FIGS. 2 and 3). The rationale in incubating these components in the precolumn 34 is that the rate of luminon formation with some critical structure attributes (CSAs) can require 15 minutes, particularly with covalent binding of a *$S_{as}$ to an $A_n$. The platform is designed to compensate for reactions of this length by running them in parallel with prior sample processing in Sector 2.

It can be assumed in all the analyses described herein that cells and biological particulates will be removed before they arrive at the analytical platform. Sample volumes available for analysis are determined by the rate of harvesting. With fermenters exceeding 50 liters in culture volume analytical samples are 100 to 200 uL in volume. At the other extreme 2-10 uL samples are taken from process development fermenters of a liter or less in culture volume. Sampling occurred at 15 to 30 min intervals in most cases. Downstream monitoring of process scale chromatography eluent is achieved with continuous sampling at 1-10 uL/min. The aliquot volume of the precolumn is determined by the sum of the sample volume and reagent to sample volume ratio.

The rationale in using a non-porous particle (NPP) precolumn 28, 34 to accomplish mAb:*$S_{as}$ complex formation is to minimize bandspreading before eluting the sample into the Sector 2 column. Although NPP silica particles are preferred, any rigid NPP can be used if the surface is passivated with a hydrophilic coating that minimizes or precludes interaction of proteins and reagents with the particle surface. The aliquot volume used in assays is determined by the interstitial volume of the precolumn. The flow rate ($F_r$) used in precolumn elution is calculated by the equation $F_r=1.13r^2$ where r is the column radius. Column diameters used in the present disclosure are 1.0, 2.1, 4.6, or 7.8 mm, depending on the available sample volume. The 7.8 mm precolumn is preferred in the case of sampling a large reactor versus the 1.0 mm column in process development with small fermenters.

At completion of mAb:*$S_{as}$ complex formation the sample is displaced by the sampling valve 36 into Sector 2 with a stream of mobile phase bearing a sequestron ($N_c$~$P_{as}$). The preferred primary affinity selectors of choice are Protein L, protein A, an aptamer or *$^2$p$Ab_{mAb}$. After displacement of the mAb:*$S_{as}$ complex from the precolumn, pump #1 32 is switched to buffer 32 for continuing elution of the Sector 2 SEC column. The pH of the displacing liquid phase delivered by pump #1 depends on the optimum pH for primary affinity selector association with the mAb:*$S_{as}$ complex. The preferred flow rate ($F_r$) is $1.66\times10^{-3}/\pi r^2$ where the radius (r) of the precolumn and SEC column are in cm and flow rate is in mL/min.

After displacing the mAb:*$S_{as}$ complex into Sector 2, the precolumn 28, 34 is reloaded with reagents and another sample while the previous analysis is being completed in Sectors 2 and 3. The critical structure attribute(s) chosen for analysis are designated at the beginning of each critical quality assessment. Luminon assays differ from sequestome assays in that the mAb:*$S_{as}$ complex is displaced into the Sector 2 column by buffer alone. $N_c$~$P_{as}$ is not used as a displacer.

FIG. 2 is an illustration of the structure of luminon ($A_n$*$S_{as}$) and sequestome ($N_c$~$P_{as}$:mAb:*$S_{as}$) complex formation in the automated luminon and sequestome assay systems disclosed herein. The initial step with both assays is luminon formation in the Sector 1 pre-column which is then transported into the Sector 2 SEC column, but this is not a prerequisite. Alternatively, mAb:*$S_{as}$ complex can be formed totally in the SEC column, using Sector 1 only for sample introduction. With luminon assays the mAb:*$S_{as}$ labeled proteoform(s) are resolved according to differences in their molecular weight and then detected in Sector 3. In sequestome assays an aliquot of sequestron 31 is injected in the SEC column behind the luminon zone. Being of higher molecular weight, sequestron passes through the luminon zone, forming the sequestome ($N_c$~$P_{as}$: mAb:*$S_{as}$) complex. All proteoforms within a sequestome elute in the void volume of the SEC column as a single peak.

Sector 2. Sector 2 is configured to execute sequestome or luminon assays. The rationale in sequestome assays is that through differential rates of linear velocity in an SEC column a nanoparticulate sequestron ($N_c$~$P_{as}$) zone can be caused to migrate through a zone of mAb:*$S_{as}$ complex with formation of a sequestome ($N_c$~$P_{as}$:mAb:*$S_{as}$) complex. Formation of the sequestome occurs in the first part of the column, generally within 30-60 sec after mixing. In becoming part of the sequestome complex the effective molecular weight of $A_n$ becomes 2-4 mDa. Species of this size migrate through SEC columns of 30 to 50 nm pore diameter in the void volume, ahead of other sample components. The sequestome eluted in pure form from the SEC column and is transported to Sector 3 for detection. Because the primary affinity selector ($P_{as}$) in a sequestron ($N_c$-$P_{as}$) selects all proteoforms of an analyte, all the critical structure attributes in a proteoform family coelute from the Sector 2 SEC column 40.

Luminon assays (FIG. 5) differ from sequestome assays in that critical structure attribute bearing proteoforms in the mAb:*$S_{as}$ complex are not further sequestered by a nanoparticulate primary affinity selector. In the preferred method, the mAb:*$S_{as}$ is directly transported into a Sector 2 liquid chromatography (LC) column without sequestron addition. The mAb:*$S_{as}$ complex is formed in the precolumn under zero flow or through dynamic mixing in the SEC column.

Generally, the LC separation is by size exclusion or ion exchange chromatography. In luminon assays a high selectivity fluorescent labeled secondary affinity selector (*$S_{as}$) will cause proteoforms with a specific critical structure attribute (CSA) to be fluorescent labeled. The rationale in luminon assays is that *$S_{as}$ derivatized CSA species alone will be detected in analytes eluted into a fluorescence detector. This is because analytes are both molecular recognition and fluorescent coded at a specific CSA.

Luminon assays can also be executed in a continuous addition mode; that being continuous addition of either sample or primary affinity selector (*$S_{as}$) to the chromatography column 40. In the first case a small, fluorescent labeled peptide secondary affinity selector (*$S_{as}$) is added to a 30 nm pore diameter SEC column continuously and a sample aliquot is injected into the mobile phase. The mAb proteoforms in the sample are of higher linear velocity and mix with the peptide in the SEC column due to differences in their linear velocity, forming mAb:*$S_{as}$ complexes with the mAb monomer, dimer, and larger aggregates. As these complexes continue to migrate through the SEC column, they are resolved from each other and from the fluorescent labeled peptide. Effluent from the SEC column is directed through a fluorescence detector where substances bearing *$S_{as}$ alone are detected. Because *$S_{as}$ is continuously added to the mobile phase, a constant background fluorescence is detected. Peaks of positive fluorescence in the chromatogram are mAb proteoforms while the negative peak arises from the subtraction of *$S_{as}$ from the mobile phase (FIG. 1). Note that the sum of *$S_{as}$ fluorescence in the proteoform peaks is higher than that lost from derivatization. *$S_{as}$ fluorescence is enhanced after binding to the mAb proteoforms, which is a characteristic of some fluorophores. The linear dynamic range in this luminon assay mode can be 30 with the NIST mAb.

An alternative luminon assay method is the reverse of the continuous reagent addition mode; that being to continuously add sample to the SEC column and inject an aliquot of the primary affinity selector (*$S_{as}$).

FIG. 3 is an illustration of the steps leading up to sequestome formation and resolution in the SEC column. The mechanism of sequestome sandwich ($N_c$~$P_A$:mAb:*$P_L$) formation is illustrated in FIG. 2. Excess *$P_L$ and non-analytes in a sample leaving the precolumn are separated from the sequestome sandwich formed in the Sector 2 by the SEC column, allowing quantification of labeled *$P_L$ in the sequestome sandwich.

Sector 3. Critical structure attribute (CSA) detection and quantification is generally achieved in Sector 3 by fluorescence detector 45. Because analyte proteoforms and the primary affinity selector ($P_{as}$) in a sequestron ($N_c$-$P_{as}$) have similar absorbance properties, analyte ($A_n$), detection by absorbance is a problem in sequestome assays. That issue is addressed in the present disclosure by labeling the secondary affinity selectors (*$S_{as}$) with a fluorophore (*). Since association of a CSA with *$S_{as}$ is stoichiometric and selective, CSAs can be identified using a CSA specific fluorophore on an *$S_{as}$ selector.

It is important to note that the term analyte ($A_n$) as used herein refers to a proteoform family having many critical structure attributes (CSAs). Sequestomes ($N_c$~$P_{as}$:mAb: *$S_{as}$) bear a proteoform family and a variety of CSAs that eluted together from the Sector 2 SEC column and are transported to a fluorescence detector in Sector 3 where a single or multiple CSAs are detected and quantified (FIGS. 3 and 4).

The fluorescence detector 45 used in Sector 3 depends on the mode of detection. Detection of a fluorescent labeled single critical structure attribute (CSA) requires single wavelength excitation and emission for detection. Simultaneous detection of multiple CSAs requires one or more excitation and multiple detection wavelengths. $A_n$ advantage of FRET detection is the ability to use a single excitation wavelength and multiple analyte detection within sequestome complexes. Time-resolved FRET detection is another possibility; the advantage being in reducing background fluorescence. In all cases the detector must be tuned to the requisite excitation and emission wavelengths of the fluorophores being detected.

Sector 4. Enzyme amplification in ELISA enables enhanced detection sensitivity. Configuring the platform for detection by enzyme amplification in sequestome assays is illustrated in FIG. 1. A secondary affinity selector with an immobilized enzyme ($S_{as}$~E) stored in a separate Sector 1 reagent container 24 can be used in an enzyme amplification assay mode for single antigen detection. The method format in Sectors 1 and 2 is used in this assay method as described above. As the $N_c$~$P_{as}$: mAb:$S_{as}$~E complex eluted from Sector 2, the effluent is directed into Sector 4 through the enzyme amplification valve 50 by a substrate pump 51. The requisite substrate for enzyme amplification in Sector 4 is added to the stream through a microvolume mixer 52, the rationale being the same as in Sector 1.

The post-column reactor column 53 in Sector 4 is of the same dimensions as the precolumn 28, 34 in Sector 1. The rationale for using non-porous particles is to limit separation of the low molecular weight product of the enzyme reaction from the high molecular weight sequestome carrying the enzyme. The scheme has been used to continuously detect enzymes eluting from an anion exchange chromatography column. Non-porous particle columns of this length can be too short to generate substantial resolution by hydrodynamic chromatography. This enables products of the enzyme reaction in the post-column-reactor to co-elute, maximizing peak height in the detector. Enzyme amplification time is controlled by flow rate and column length. This also allows enzyme amplification from multiple sample aliquots to be achieved simultaneously. Product formation is detected in the flow-through detector of the type illustrated in Sector 3 by enzyme product absorbance or fluorescence.

In-Line Platform.

The analytical system and methods used in the present disclosure for in-line monitoring differ from the at-line systems and methods described above. In-line monitoring as described herein refers to monitoring effluent from a fermentor or an analytical device. Analytical sector 4 in FIG. 1 is an example of in-line detection in an analytical device.

Figure 7:
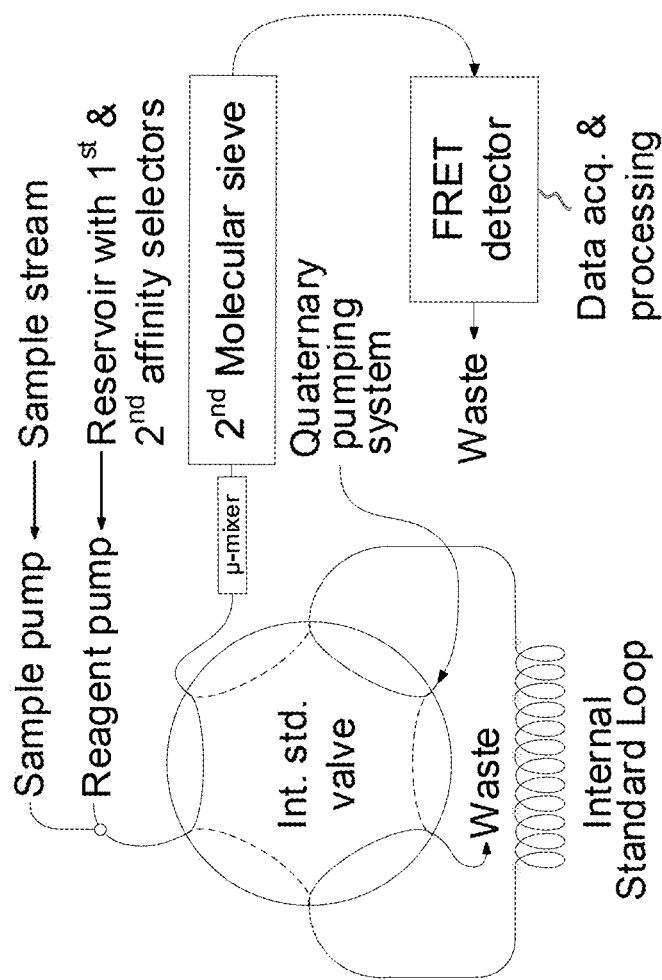
FIG. 7 is a diagram of in-line FRET (Förster resonance energy transfer) detection in mAb titer monitoring. Protein L labeled with a donor fluorophore is used with protein A bearing an acceptor fluorophore. Internal standard is intermittently switched into the sample stream to calibrate detector sensitivity. Internal standard to analyte signal ratio is used to calculate analyte concentration.

With in-line monitoring: i) the primary and secondary affinity selectors along with sample are continuously introduced into the analytical detection means; ii) reagents and sample components are mixed with a µ-mixer and transferred to an SEC column that further mixed reagents and sample components; iii) without sequestome resolution; and iv) detection is achieved by fluorescence or FRET (FIG. 7).

When continuously harvesting analyte from a fermenter there is a continuous FRET signal. This made it difficult to quantify analyte concentration. That problem is solved by periodically introducing either a buffer or internal standard of known concentration into the effluent stream. The FRET signal drops to zero with injected buffer or to a known value with an internal standard of known concentration. The differential signal level is used to calculate analyte concentration in samples.

Figure 8:
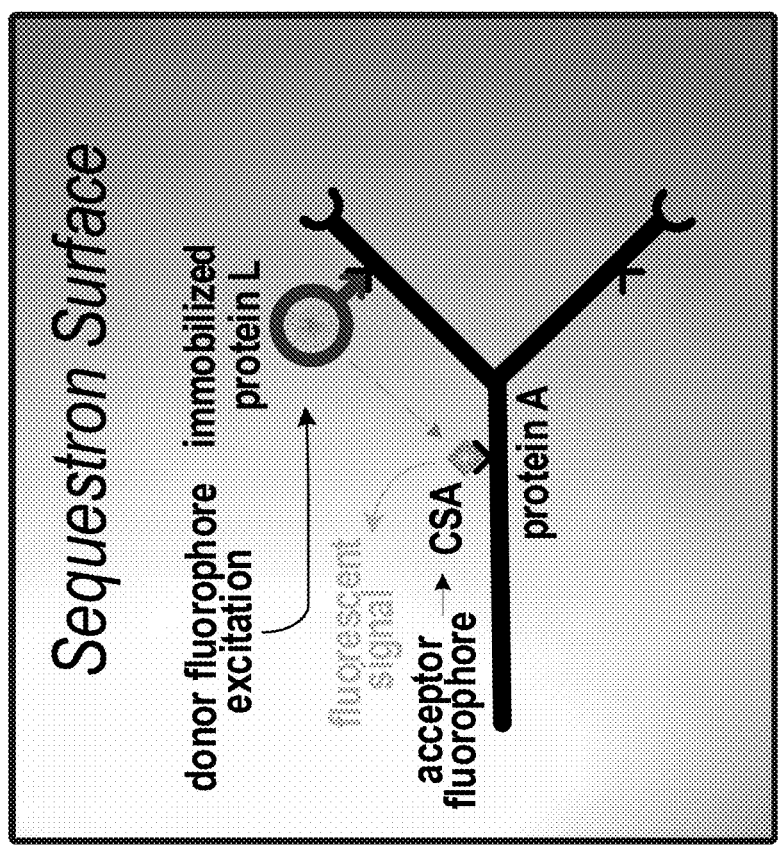
FIG. 8 is a representation of a FRET assay in which protein L labeled with a donor fluorophore is used to derivatize a monoclonal antibody family in a culture medium. Protein A labeled with an acceptor fluorophore is simultaneously bound in the Fc region of the antibody. Detection is achieved by FRET.

In-line mAb titer is monitored by the above FRET detection system (FIG. 7) wherein the primary affinity selector is protein L with a covalently coupled donor fluorophore. Protein A labeled with an acceptor fluorophore can also be used as a secondary affinity selector (FIG. 8). With mAb titer monitoring both the primary and secondary affinity selectors targeted conserved structure domains.

As described above, the processes disclosed herein utilize the flow-through detection means to detect and quantify one or more proteoforms simultaneously. The fluorescent labeled secondary affinity selectors (*$S_{as}$) are used to identify and quantify critical structure attributes (CSAs) in analytes sequestered within the sequestome complex, and the flow-through detection means generates corresponding CSA data. In order to assist with continuous process validation (CPV), the CSA data is incorporated into contemporaneous fermentation sensor data, instrument performance data, and run-time data for the particular process being validated. A data provenance is then constructed for submission to regulatory agencies charged with validating the process. In one embodiment, the CSA and run-time data collected during a production campaign are integrated and displayed in a three-dimensional map, wherein the data gathered from each assay is collected in the form of a liquid chromatogram and assigned an elapsed fermentation time number. The chromatograms are displayed as a signal intensity versus chromatographic retention time plot and chronologically integrated into a 3D map according to their fermentation time number. Variable CSA signal intensity in chromatograms is plotted as a relative value based on the signal intensity of an internal standard constant CSA in its proteoform family. Process continuity can then be evaluated based on the continuity of variable CSA to constant CSA peak ratios.

What is claimed is:

1. A method for simultaneously identifying and quantifying one or more critical structure attributes (CSAs) in a proteoform or proteoform family using an analytical platform comprising the steps of:
   a) sampling one or more sample sources sequentially at predetermined time intervals, wherein the samples are derived from a fermenter, cell culture, or organism, from which particulate matter and cells are removed before delivery to the analytical platform;
   b) continuously adding a stream of reagent including one or more detection enhanced labeled secondary affinity selectors to mix with the samples as they are introduced into the analytical platform, wherein;
      (i) the function of each secondary affinity selector addition to samples is to label a CSA in an analyte for subsequent identification and quantification,
      (ii) each secondary affinity selector is selected from any one of multiple secondary affinity selector sources in the analytical platform, and
      (iii) the concentration of secondary affinity selector in the stream exceeds the anticipated maximum concentration of analyte(s) by 50%;
   c) directing the combined sample/reagent mixture through a micro-volume mixer into a precolumn of fixed volume packed with 2-20 um non-porous particles,
   d) incubating said mixture in the precolumn at a pre-determined temperature for a pre-determined time to allow sequestration of the secondary affinity selector by a specific CSA in the analyte, forming a luminon complex;
   e) allowing luminon complex formation to continue until secondary affinity selector binding to the analyte has reached equilibrium;
   e) displacing the luminon complex from the precolumn into a down-stream size exclusion chromatography (SEC) column by a primary affinity selector reagent stream, wherein;
      (i) the primary affinity selector and the luminon complex entering the SEC column are un-mixed,
      (ii) the molecular weight and linear velocity of the primary affinity selector entering the SEC column exceeds those of the luminon complex,
      (iii) the amount of primary affinity selector exceeds the amount of luminon complex formed in the precolumn,
      (iv) the primary affinity selector and luminon complex mix as they migrate through the SEC column, and
      (v) the primary affinity selector binds all proteoforms, irrespective of whether the proteoforms bear a derivatizable CSA, forming a sequestome complex;
   f) subsequently resolving the sequestome complex from any unbound secondary affinity selector and non-analytes in the SEC column;
   g) transporting the sequestome complex thus resolved into a flow-through detection means; and
   h) using the flow-through detection means, detecting and quantifying one or more proteoforms simultaneously, wherein each secondary affinity selectors is used to identify and quantify one or more CSAs in analytes sequestered within the sequestome complex.

2. The method of claim 1, wherein a different set of affinity selectors are used, including:
   a constant region CSA sequestering, fluorescent labeled primary affinity selector that is not immobilized on a nanoparticle and that has a low molecular weight; and
   one or more unlabeled secondary affinity selectors targeting variable CSAs to simultaneously sequester and form intermolecular complexes;
   wherein the complexes are resolved by SEC when the different set of affinity selectors of appropriate molecular weight are selected.

3. The method of claim 1, wherein all aspects of sample preparation are achieved in the SEC column through continuous addition of the requisite reagents into the SEC mobile phase and sample is injected into the mobile phase, wherein:
   reagents including primary and secondary affinity selectors in various combinations are continuously added to the SEC column in the mobile phase; and
   sample is injected into the mobile phase, wherein differences in the linear velocity of all the components cause mixing and formation of the sequestome complex.

4. The method of claim 1, wherein the secondary affinity selectors is selected from protein L, protein A, protein G, protein A/G, a phage display protein, a peptides, a lectin, an affimer, an aptamer, a particular DNA sequence, a unique RNA sequence, and a covalent derivatization reagent.

5. The method of claim 1, wherein the detection enhancer for labeling the secondary affinity selectors include moieties that enhance detection by one or more of fluorescence, absorbance, chemiluminescence, surface plasmon resonance, refractive index, light scattering, electrochemical means, and enzyme amplification.

6. The method of claim 1, wherein the sequestome has the general structure $N_c\sim(P_{as})_m:(A_n)_n(*S_{as}E)_o$, where $N_c$ is a nanoparticle medium and $(P_{as})_m$ are multiple (m) primary affinity selectors on the nanoparticle medium, $(A_n)_n$ are (n) molecules of an analyte, $*S_{as}$ is a secondary affinity selector and E is an enzyme immobilized with the secondary affinity selector with (o) indicating the number of molecules of $*S_{as}E$.

7. The method of claim 1, wherein prior to the step of transporting the resolved sequestome complex to the flow-through detection means, the squequestone complex is directed into an amplification column in which:
   enzyme substrate is continuously added to the effluent stream exiting the SEC column,
   resolution of the sequestome complex and enzyme substrate in the incubation column are diminished by packing the amplification column with non-porous particles that have been surface deactivated to eliminate non-specific binding; and
   selecting a flow rate-based residence time and temperature during transport that meets the sensitivity needs of the assay.

8. The method of claim 1, further comprising:
using flow-through detection to generate corresponding CSA data;
incorporating the CSA data into contemporaneous fermentation sensor data, instrument performance data, and run-time data for the process being validated; and then constructing a data provenance for submission to a regulatory agency to validate the process.

9. The method of claim 8, wherein the data provenance is blockchain coded for inter-lot process validation.

10. A luminon assay method for analyzing one or more critical structure attributes (CSAs) in a proteoform or proteoform family through sequestration of one or more affinity selectors, comprising the steps of:
   a) chronologically selecting a cell and particulate-clarified sample from a process development or production fermenter, a cell culture, or organism,
   b) continuously adding mobile phase bearing a fluorescent low molecular weight labeled molecular recognition agent ($M_{ra}$) to a size exclusion chromatography (SEC) column, the $M_{ra}$ being either a primary or a secondary affinity selector,
   c) injecting a sample including an analyte protein ($A_p$) into the SEC column, wherein;
      (i) the linear velocity of the ($A_p$) is more than twice the size of the $M_{ra}$,
      (ii) the greater linear velocity of the $A_p$ relative to the $M_{ra}$ causes the two to mix, thereby forming a luminon complex, and
      (iii) the high linear velocity of the luminon complex causes the complex to move into a saturating concentration of $M_{ra}$ and be washed repeatedly as it migrates to a flow-through detector,
   d) transporting the luminon complex thus resolved into a flow-through detection means; and
   e) using the flow-through detection means, detecting and quantifying one or more CSAs in analytes sequestered within the luminon complex.

11. A method for in-line monitoring of one or more critical structure attributes (CSAs) in a proteoform or proteoform family by analyte sequestering of affinity selectors, comprising the steps of:
   a) continuously providing a cell and particulate clarified sample stream, including the proteoform or proteoform family, from a fermenter, cell culture, or organism;
   b) continuously adding affinity selector reagents to the sample stream to form a mixture, wherein
      (i) at least a first reagent is labeled with a donor fluorophore that binds specifically to a protein analyte, and
      (ii) at least a second reagent is labeled with an acceptor fluorophore that binds to a CSA in the protein analyte;
   c) introducing the mixture of reagents and sample continuously through a stationary micro-mixer into an incubation or SEC column, wherein;
      (i) reagents concentration exceeds anticipated levels of the analyte and CSAs, and
      (ii) the combined volume of reagents is less than that of the sample;
   d) adapting the flow rate through the micro-mixer or SEC column to allow formation of one or more fluorescence labeled complexes;
   e) transporting the complexes to a fluorescence detection means capable of detecting a single or multiple analytes, wherein
      (i) the detection means includes Förster resonance energy transfer (FRET) spectroscopy, or
      (ii) detection is achieved by a change in fluorescence after association of the affinity selectors with the analyte;
   f) identifying and quantifying specific CSAs of the proteoform or proteoform family based on selector fluorophore spectral properties for use in process validation.

12. The method in claim 11, wherein
a first fluorescent labeled reagent is continuously added to the mobile phase, and
fluorescence of threagent-analyte complex is continuously monitored after transport to a detection means.

* * * * *